United States Patent [19]

Suzuki et al.

[11] 4,354,991
[45] Oct. 19, 1982

[54] DENSE SINTERED SILICON CARBIDE CERAMIC

[75] Inventors: Keiichiro Suzuki; Takuro Ono; Nobuhiro Shinohara, all of Yokohama, Japan

[73] Assignee: Asahi Glass Company, Ltd., Tokyo, Japan

[21] Appl. No.: 283,238

[22] Filed: Jul. 14, 1981

[30] Foreign Application Priority Data

Jul. 17, 1980 [JP] Japan .................................. 55-96828
Aug. 29, 1980 [JP] Japan .................................. 55-118460

[51] Int. Cl.$^3$ ............................................. C04B 35/56
[52] U.S. Cl. ....................................... 264/65; 501/89
[58] Field of Search ..................... 501/89; 264/65, 332

[56] References Cited

U.S. PATENT DOCUMENTS

| | | |
|---|---|---|
| 3,520,656 | 7/1970 | Meadows et al. ................. 501/89 |
| 3,538,205 | 11/1970 | Gates et al. ....................... 501/89 |
| 3,759,725 | 9/1973 | Steen .................................. 501/89 |
| 3,836,673 | 9/1974 | Weaver et al. ..................... 501/91 |
| 3,968,057 | 7/1976 | Dulin ................................. 501/89 |
| 3,998,646 | 12/1976 | Weaver .............................. 501/89 |
| 4,179,299 | 12/1979 | Coppola et al. ................... 501/90 |
| 4,230,497 | 10/1980 | Schwetz et al. ................... 501/89 |

FOREIGN PATENT DOCUMENTS

| | | |
|---|---|---|
| 2544675 | 4/1976 | Fed. Rep. of Germany ........ 501/89 |
| 2912443 | 10/1980 | Fed. Rep. of Germany ........ 501/89 |
| 1460635 | 4/1974 | United Kingdom . |

OTHER PUBLICATIONS

Artemora A. A. et al., "Shock Synthesis of the Ceramics $Al_2O_3$–Mo and $Al_2O_3$–SIC.", Inorganic Materials, vol. 10, No. 12, Dec. 1974, Pub. May 1975.
"Journal of the American Ceramic Society", vol. 39, No. 11, pp. 386–389.

*Primary Examiner*—M. L. Bell
*Attorney, Agent, or Firm*—Oblon, Fisher, Spivak, McClelland & Maier

[57] ABSTRACT

A dense sintered silicon carbide ceramic has high strength and a flexural strength of at least 25 kg/mm$^2$ at room temperature and 1400° C. which is obtained by molding a mixture of an aluminum oxide source at a ratio of 0.5 to 35 wt. % as $Al_2O_3$ and silicon carbide at a substantial residual portion followed by a pressureless sintering.

21 Claims, No Drawings

DENSE SINTERED SILICON CARBIDE CERAMIC

BACKGROUND OF THE INVENTION

1. Field of the Invention

The present invention relates to a sintered silicon carbide. More particularly, it relates to a dense sintered silicon carbide having high strength obtained by a pressureless sintering as a normal sintering.

2. Description of the Prior Art

Silicon carbide is well known as a useful ceramic source having high hardness, excellent wear resistance, low thermal expansion coefficient, high decomposition temperature, high oxidation resistance and chemical resistance, and relatively high electric conductivity. A dense sintered silicon carbide has said characteristics and also has high strength even at high temperature, high heat shock resistance, and is considered to be effective as a source for high temperature structural products and to be used for various uses such as a gas turbine. Silicon carbide has relatively high covalent bond whereby it is difficult to sinter silicon carbide by itself. In order to obtain a dense sintered product, it is necessary to incorporate a certain sintering additive. In a hot press process, boron, $B_4C$, aluminum, AlN or $Al_2O_3$ has been used as a sintering additive. In the prior art, for example, U.S. Pat. No. 3,836,673, a sintered silicon carbide having a strength of $10^4$ psi (70 kg/mm$^2$) has been obtained by a hot press under an addition of 0.5 to 5 wt.% of aluminum. Thus, the use of metallic aluminum and the hot press process have the below-mentioned disadvantages.

In a pressureless sintering, it has been known to incorporate aluminum and carbon. In the prior art, for example, U.S. Pat. No. 4,280,497, a product having high flexural strength has been obtained by a pressureless sintering of a mixture of silicon carbide and 0.2 to 2 wt.% of aluminum component and 0.1 to 2.0 wt.% of carbon component. In this process, aluminum is mainly used and carbon is added for an acceleration of sintering. As the carbon source, a resin is used whereby a hardening of a resin causes trouble in the process. Moreover, the conventional pressureless sintered product has not been satisfactory in view of the characteristics and process.

SUMMARY OF THE INVENTION

It is an object of the present invention to provide a sintered silicon carbide having superior characteristics to the conventional products by a pressureless sintering process without a hot press process.

The foregoing and other objects of the present invention have been attained by providing a sintered silicon carbide ceramic having a special strength obtained by a pressureless sintering of a mixture of 0.5 to 35 wt.% of aluminum oxide and a residual portion of silicon carbide.

DETAILED DESCRIPTION OF THE PREFERRED EMBODIMENTS

It has been known to use aluminum oxide as a sintering additive for silicon carbide. However, the characteristics and the production of the conventional products are quite different from those of our invention. One kind of the conventional product belongs to refractory fire brick as disclosed in the prior art, U.S. Pat. No. 3,759,725 and British Pat. No. 1,460,635 and is obtained by molding a mixture of coarse aggregate of silicon carbide and aluminum oxide followed by sintering it at about 1200° to 1500° C. The product comprises a thick layer of aluminum oxide or silicon oxide around silicon carbide grains.

On the other hand, it has been proposed to use aluminum oxide as a sintering additive for a hot press to produce a dense sintered silicon carbide ceramic in J. Am. Ceram. Soc. 39(11) 386–389, 1956 by Alliegro et al.

At the first stage of the studies, it has been considered that the effect of aluminum oxide on silicon carbide in the hot press process is similar to the pressureless sintering process. It has been also considered that the sintered product obtained by the hot press process has higher density and strength than the sintered product obtained by conventional pressureless sintering when the same molded product of the mixture having the same formulation is sintered at the same temperature by the hot press process and the pressureless process because of the pressure effect. Thus, it has been found that a sintered product having higher strength is obtained by a pressureless process in comparison with the hot press process according to various studies. As shown in the examples, the strength at high temperature is highly different. It is considered that the sintering mechanism is the pressureless sintering process is different from the hot press process. The microstructure of the resulting sintered product is also different.

In the hot press process, the pressure is applied in the pressure of the liquid phase comprising aluminum oxide as a main component to easily form a dense structure, however, the sintered product has a microstructure having equiaxed grains (block-like) placing aluminum oxide around silicon carbide grain. At high temperature, aluminum oxide placed around the silicon carbide grains softens to cause a serious decrease in strength. On the other hand, in the pressureless sintering process, the sintering mechanism is unknown and is considered that a desired growth of grains of silicon carbide is resulted in the presence of enough of the liquid phase comprising aluminum oxide as a main component during the sintering and the decomposition and evaporation of the components comprising aluminum oxide as a main component are resulted and aluminum oxide contributed to the dense structure is separated from the molded product to form a strong microstructure intertwining grown prismatic or plate-like grains.

According to the observation by an electron microscope, aluminum oxide grains are often found among silicon carbide grains in the sintered product but a second phase of aluminum oxide is not found at most the grain boundary between the silicon carbide grains. In same of the sintered products, aluminum oxide is not found.

A desired structure of the sintered product obtained in the present invention is made of the intertwined $\alpha$- and $\beta$-SiC grains comprising fine prismatic or plate-like $\beta$-SiC grains as a main component. In most sintered products obtained in the present invention, $\alpha$-SiC is 80–10 vol% and $\beta$-SiC is 20–90 vol%. It is found that such structure is obtained by a pressureless sintering of a fine $\beta$-SiC powder having a specific surface area of at least 10 m$^2$/g as a source of the strong structure. When $\alpha$-SiC is used as a source, it usually provides the structure of block-like SiC grains as a main component.

The sintered product having high strength at high temperature obtained by the hot press process using aluminum oxide as a sintering additive is disclosed in Example 34 of U.S. Pat. No. 3,520,656. The structure of the sintered product is the structure by the hot press process. The strength of the sintered product is not satisfactory at higher than 1200° C. and the disadvantages of the hot press process are not overcome.

It is known to obtain a sintered silicon carbide having high strength in U.S. Pat. No. 3,998,646. The process is not clear, whether it is a hot press process or a pressureless sintering process, and the necessity of an addition of aluminum oxide is not found, and the sintered silicon carbide ceramic having the characteristic structure is not shown.

The above-mentioned fact shows that the sintered silicon carbide ceramic of the present invention is different from the conventional silicon carbide-aluminum oxide refractory, the silicon carbide ceramics obtained by the hot press process using aluminum oxide additive or the silicon carbide ceramic obtained by the conventional pressureless sintering process.

The sources and the production of the present invention will be illustrated in detail.

The silicon carbide (SiC) source can be both of α-form and β-form though β-form is preferable as described above. The purity is best preferably at least 98% and is better preferably at least 95% though it can be 90 to 95% for practical use. A particle size of fine grains is usually shown by a specific surface area rather than an average particle diameter.

In order to obtain a sintered product having a flexural strength of at least 25 kg/mm$^2$ especially at least 30 kg/mm$^2$ at room temperature and 1400° C. and a density of at least 3.0 as at least 90% of theoretical density, it is necessary for the source to have a specific surface area of at least 5 m$^2$/g. In order to obtain a sintered product having a flexural strength of at least 35 kg/mm$^2$ at room temperature and 1400° C., it is preferable for the source to have a specific surface area of at least 10 m$^2$/g in the case of 6 to 35 wt.% of aluminum oxide and at least 15 m$^2$/g in the case of 0.5 to 6 wt.% of aluminum oxide and the flexural strength of at least 40 kg/mm$^2$.

The aluminum oxide ($Al_2O_3$) source is preferably corundum α-$Al_2O_3$, but can be the other crystalline material such as γ-form. Aluminum sources such as aluminum hydroxide and aluminum sulfate which can be converted into aluminum oxide by heating in a non-oxidative atmosphere can also be used. The aluminum oxide means to include the precursor for easily forming aluminum oxide. Aluminum oxide has preferably a purity of at least 98%, to have low sodium content and have an average particle diameter of upto 1 μm, preferably upto 0.2 μm.

In the present invention a mixture of the aluminum oxide source (0.5 to 35 wt.% as $Al_2O_3$) and silicon carbide is used. It is possible to incorporate a small amount of the other aluminum source such as aluminum nitride (AlN), aluminum carbide ($Al_4C_3$), aluminum diboride ($AlB_2$), aluminum phosphide (AlP), aluminum silicon carbide ($Al_4SiC_4$) and aluminum (Al).

A ratio of aluminum oxide source to a total of aluminum oxide and silicon carbide is in a range of 0.5 to 35 wt.% as $Al_2O_3$. When it is less than 0.5 wt.%, the dense structure is not formed in the sintering and a dense sintered product having a density of at least 90% of the theoretical density can not be obtained, whereas when it is more than 35 wt.%, the dense structure is formed but the strength is too low even though it is sintered at a lower temperature of upto 1900° C. When it is more than 35 wt.% and the molded product is sintered at 1900° to 2300° C., the decomposition is severe to form a porous structure and undesired aluminum oxide remains in the sintered product. A content of the aluminum oxide source is preferably in a range of 2 to 20 wt.% as $Al_2O_3$.

When the content of the aluminum oxide source is in a range of 6 to 35 wt.%, and silicon carbide having a specific surface area of at least 10 m$^2$/g and a purity of at least 95% preferably 98% is used, it is possible to easily obtain a sintered product having a density of at least 90% of the theoretical density and a flexural strength of at least 35 kg/mm$^2$ at room temperature and 1400° C. When the content of aluminum oxide is in a range of 0.5 to 5 wt.% and silicon carbide having a specific surface area of at least 15 m$^2$/g and a purity of at least 98% is used, it is possible to easily obtain a sintered product having a density of at least 90% of the theoretical density and a flexural strength of at least 40 kg/mm$^2$ at room temperature and 1400° C.

In the present invention, it is preferable to prepare a mixture of the aluminum oxide source and the substantial residual portion of silicon carbide. It is one of the advantages to attain the object by using such sources. It is possible to contain impurities of the silicon carbide source and a small amount of other components incorporated in a pulverizing step. As described below, certain components such as silicon oxide can be incorporated at a relatively large content. This is one of the advantages.

All molding processes for molding ceramics can be employed as the molding process. A press molding process, a slip casting process, an injection molding process and an extrusion molding process can be employed. The sintering is carried out in a non-oxidative atmosphere under pressureless condition at 1900° to 2300° C. The non-oxidative atmosphere is the atmosphere of nitrogen, argon, helium, carbon monoxide and hydrogen. It is especially preferable to have the atmosphere of argon and helium. As mentioned below, the treatment in the atmosphere containing the aluminum component is especially preferable. As the method of the formation of the non-oxidative atmosphere, it is preferable to form the atmosphere containing certain carbon or silicon components as well as the aluminum component and to place the molded product of the aluminum oxide source and silicon carbide. The temperature for sintering is preferably in a range of 1950° to 2100° C. When the sintering temperature is lower than 1900° C., the density does not satisfactorily perform and a desired dense sintered product can not be obtained, whereas when it is higher than 2300° C., the molded product is decomposed to form a porous product. The sintering time is in a range of 1 to 48 hours, preferably 2 to 24 hours. When the sintering time is too short, the dense structure is not formed, or the satisfactory strength is not given even though the dense structure is formed. When the sintering time is too long, the decomposition is too much and a porous product is disadvantageously formed.

The desired process for producing the sintered product in the present invention will be illustrated. The aluminum oxide source as $Al_2O_3$ is incorporated as a sintering additive. In the conventional process, the aluminum oxide source is rapidly decomposed or evaporated to be removed before contributing to the densing of the molded product. Therefore, the satisfactory density is not attained and an object dense sintered product is not obtained.

In order to overcome these problems, various tests have been made. As a result, it is found to preferably sinter the molded silicon carbide containing the aluminum oxide source in the atmosphere including aluminum or aluminum component. That is, a dense sintered product is easily obtained by sintering the molded product in the atmosphere including one or morel of aluminum and aluminum compounds. In accordance with such process, an amount of aluminum oxide removed before completing the densing of the molded product is reduced to obtain a dense sintered product having stable formulation and structure. On the other hand, silicon carbide itself begins to decompose at the sintering temperature for the molded silicon carbide. That is, silicon carbide is not melted in the atmospheric pressure and begins to sublimate at higher than 2000° C. and is decomposed into carbon and silicon rich vapor at higher temperature. The sintering temperature for producing the dense sintered product in the present invention is in a range of 1900° to 2300° c. In the high temperature zone, the sublimation and decomposition of silicon carbide are caused to generate the vapor of silicon and disilicon carbide Si$_2$C. When the molded silicon carbide is sintered in the atmosphere containing the vapor of Si and Si$_2$C, the sublimation and decomposition of silicon carbide in the molded product can be reduced. But, the decomposition of silicon carbide is not simple in a practical operation. Thus, it results in certain mutual reactions of the aluminum oxide source as the sintering additive, and a silica layer of the surface of silicon carbide grains and other impurities and a small amount of oxygen in the atmosphere. In order to prevent a decomposition of the molded product during the sintering to obtain a dense sintered product, it is preferable to maintain a partial pressure of the gas in the atmosphere over the equilibrium vapor pressure of the gas generated by the decomposition of the molded product.

When the molded silicon carbide containing the aluminum oxide source is sintered, it is difficult to confirm the kinds of reactions and gases generated. In various tests, it is found to preferably sinter the molded silicon carbide containing aluminum oxide in the atmosphere including aluminum and silicon and/or carbon components to obtain a dense sintered product having uniform formulation and structure.

In the decomposition of the molded product in the sintering it is considered to mainly result in the following reaction:

$$SiC + Al_2O_3 \rightarrow Al_2O + SiO + CO$$

When the partial pressure of the gases of Al$_2$O, SiO and CO in the atmosphere during the sintering is more than the equilibrium vapor pressure of the gases generated by decomposing the molded product, the decomposition of the molded product is reduced to obtain a sintered product having higher density.

The process will be further illustrated.

The atmosphere including the aluminum component or the aluminum and silicon and/or carbon components is provided by feeding the gas of these components in to the sintering furnace. The aluminum component gas can be fed as Al, AlCl$_3$, Al$_2$C or AlO etc.; the silicon component gas can be fed as Si, SiCl$_4$, SiH$_4$ or SiO etc. and the carbon component gas can be fed as a hydrocarbon or CO etc. Usually, the atmosphere is prepared by mixing the gas of these components with a non oxidative gas such as nitrogen, argon and helium. In the other method, it is effective to place a powder or a molded product or a sintered product for generating the gas of these components at the sintering temperature around the molded silicon carbide.

(1) The atmosphere is formed by aluminum powder, one or more aluminum compound powders or a molded product of the powder which is placed around the molded silicon carbide.

(2) The atmosphere is formed by one or more of aluminum powders, aluminum compound powders and one or more of silicon powders, one or more silicon compound powders, carbon powder, and carbon compound powders or an unsintered molded product of the powder which is placed around the molded silicon carbide.

(3) The atmosphere is formed by a sintered product of silicon carbide containing aluminum and or an aluminum compound which is placed around the molded silicon carbide.

As the method of placing the powder around the molded silicon carbide, the molded product is buried in the powder or is placed in a casing made of carbon or silicon carbide coating the powder on the inner wall. The method of burying the molded product in the powder is preferable because the decomposition of the molded product is well reduced. However, this method is not suitable for a large molded product or a molded product having a complicated shape. The method of coating the powder on the inner wall of the casing is suitable for molded products having various shapes. The surface condition of the sintered product is superior and the dense sintered product having the characteristics similar to the burying method can be obtained.

The coating method is attained by coating a slurry of the powder and an organic medium such as alcohol and acetone or water on the casing. It is possible to incorporate a binder such as polyvinyl alcohol in the slurry.

In the method of burying in to the powder or coating with the powder, the above-mentioned powders can be used. It is preferable to use a mixture of aluminum or an aluminum compound and silicon carbide powder and/or carbon powder. As the aluminum powder or the aluminum compound powder, it is preferable to use aluminum oxide powder through it is possible to use aluminum hydroxide, aluminum nitride, aluminum carbide etc. In the powder coating method, it is possible to use an aromatic polymer which results in high carbon residue such as phenol resins, and polymethyl phenylene instead of carbon powder.

When the silicon carbide powder and/or carbon powder is mixed with aluminum powder or the aluminum compound powder, a ratio of the aluminum component is in a range of 2 to 40 wt.% as Al. When it is less than 2 wt.%, the effect for preventing the decomposition of the molded product is not high enough and a desired dense sintered product is not obtained. When it is more than 40 wt.%, the decomposing velocity of the powder is too high and the weight loss disadvantageously is too great even though it has high density.

When the molded product is buried in aluminum powder or aluminum oxide powder, the immersion of the liquid phase of the aluminum component disadvantageously is caused.

It is preferable to use a sintered product instead of the use of the powder or the unsintered molded product. It is also, preferable to use the sintered silicon carbide containing aluminum or the aluminum compound. In this case, it is preferable to place the sintered product having the similar formulation around the molded product for sintering though it is possible to place a sintered product having different formulation.

When a sintered product is used, the surface area of a sintered product is small and the decomposing velocity is low and has the effect of maintaining the atmosphere in a desired condition for a long time in comparison with the use of the powder or the unsintered molded product. This is suitable for sintering for a long time.

The characteristic feature and advantages of the present invention are further illustrated.

(1) A dense sintered silicon carbide ceramic having high strength can be easily obtained by the pressureless sintering process.

For example, when a sintering additive of Al, AlN, B or $B_4C$ is used, a hot press process is needed whereby a product having a complicated shape or a large size can not be produced. Aluminum is easily oxidized to be difficult for use and reacts to cause foaming by contacting with water, and a fine aluminum powder is explosively dangerous. On the other hand, B, $B_4C$ and AlN are expensive and fine powder thereof is not easily available, and they are not easily ground.

(2) A sintered product having higher strength than the conventional product can be obtained.

For example, a sintering additive such as B+C, $B_4C+C$, Al+C and AlN+C can be used for the pressureless sintering, however, an aromatic polymer such as polyphenylmethylene and phenol resins is usually used as the C source. The handling is not easy and the C source should be uniformly mixed requiring a long time operation. The strength of the product in the case of B-C additive, is relatively low as 40 to 50 $kg/mm^2$ at room temperature. In the case of such sintering additive, the silicon carbide source is quite fine as a specific surface area of at least 15 $m^2g$. It is necessary to use the sources containing less content of $SiO_2$ though the sources having high content of $SiO_2$ can be used in the present invention.

(3) Aluminum oxide is stable and is not reactive with water. A step of contacting with water can be employed. A wet mixing, grinding and a slip casting by using water can be employed and the atmosphere is not limited.

(4) Even though the purity of the silicon carbide source is low (even though lower than 95%) or the grain size is relatively large (even though a specific surface area of less than 10 $m^2/g$), such factors do not highly affect the sintering process and characteristics. It is unnecessary to remove the silicon oxide layer on the surface of the silicon carbide powder. It is possible to add silicon oxide.

The present invention is remarkably advantageous in an industrial process.

The present invention will be further illustrated by certain examples and references which are provided for purposes of illustration only and are not intended to be limiting the present invention.

EXAMPLES 1 to 6 and REFERENCES 1 to 3

In Examples 1 to 6, β- or α-silicon carbide powder and aluminum oxide powder (corundum) having a purity of higher than 95% and an average particle diameter of less than 1 μm shown in Table 1 were thoroughly mixed with ethanol and each mixture was molded by a hydraulic isostatic pressure molding under a pressure of 2000 $kg/cm^2$ to form a molded product having a size of 20×40×15 mm. Each molded product was held in a carbon casing having a cover slightly larger than the volume of the molded product. The carbon casing was placed in an argon gas atmosphere and the molded product was sintered under the conditions shown in Table 1.

In References 1 to 3, each mixture was treated by a hot press in a carbon mold having an inner diameter of 30 mm under a pressure of 200 $kg/cm^2$. The densities and flexural strengths of the sintered products are shown in Table 1.

TABLE 1

|  | Exp. 1 | Exp. 2 | Exp. 3 | Exp. 4 | Exp. 5 | Exp. 6 |
|---|---|---|---|---|---|---|
| SiC |  |  |  |  |  |  |
| Main crystalline form | β | β | β | β | β | α |
| Purity (%) | 99< | 99< | 99< | 99< | 99< | 95< |
| Specific surface area ($m^2/g$) | 13.4 | 13.4 | 13.4 | 13.4 | 18.1 | 7.0 |
| $Al_2O_3$ |  |  |  |  |  |  |
| Content (%) | 25 | 15 | 3 | 2 | 3 | 13 |
| Sintering |  |  |  |  |  |  |
| Temperature (°C.) | 2000 | 2000 | 2000 | 2000 | 2000 | 1950 |
| Time (hr.) | 5 | 5 | 5 | 5 | 5 | 5 |
| Density ($g/cm^3$) | 3.06 | 3.11 | 3.13 | 3.14 | 3.18 | 3.13 |
| Flexural strength ($kg/mm^2$) |  |  |  |  |  |  |
| Room temperature | 76.7 | 87.9 | 61.6 | 45.6 | 65.1 | 56.2 |
| 1400° C. | 44.7 | 58.0 | 34.3 | 32.0 | 46.1 | 38.7 |

|  | Ref. 1 | Ref. 2 | Ref. 3 |
|---|---|---|---|
| SiC |  |  |  |
| Main crystalline form | β | β | β |
| Purity (%) | 99< | 99< | 99< |
| Specific surface area ($m^2/g$) | 7.4 | 13.4 | 7.4 |
| $Al_2O_3$ |  |  |  |
| Content (%) | 13 | 2 | 2 |
| Sintering |  |  |  |
| Temperature (°C.) | 1950 | 2100 | 2200 |
| Time (hr.) | 1 | 1 | 1 |
| Density ($g/cm^3$) | 3.19 | 3.20 | 3.19 |
| Flexural strength ($kg/mm^2$) |  |  |  |
| Room temperature | 43.0 | 54.9 | 77.0 |
| 1400° C. | 15.8 | 19.3 | 43.2 |

The samples were respectively cut and the structures of the cut surfaces of the samples were observed under a microscope. The results are as follows.

Samples 1, 2, 3 and 5

A microstructure uniformly intertwining prismatic or plate-like SiC grains having a long axis of about 2–5μ which comprises fine SiC grains.

Sample 4

The same as Samples 1, except containing, large grown grains and having slightly ununiform grain sizes.

Sample 6

A microstructure closely bonding SiC grains in block-like having a diameter of 1 to 5μ.

EXAMPLES 7 to 16

Silicon carbide powder having a purity of 99% and a specific surface area of at least 10 $m^2/g$ (commercially available) was used. Each sintering additive shown in Table 2 was mixed at each ratio shown in Table 2. Each mixture was charged in each plastic pot and thoroughly mixed with plastic balls in the presence of acetone and the mixture was dried and pressed under a pressure of 300 kg/cm$^2$ to prepare each molded product having a size of 20×20×40 mm. Each molded product was sintered in an electric resistance furnace under each condition shown in Table 2 at 2000° C. for 3 hour.

TABLE 2

|  | Exp. 7 | Exp. 8 | Exp. 9 | Exp. 10 | Exp. 11 |
|---|---|---|---|---|---|
| Sintering additive |  |  |  |  |  |
| Kind | Al$_2$O$_3$ | Al$_2$O$_3$ | Al$_2$O$_3$ | Al$_2$O$_3$ | Al$_2$O$_3$ |
| Content (wt. %) | 4 | 4 | 4 | 4 | 4 |
| Atmosphere |  |  |  |  |  |
| Method | Bury*2 | Coat*3 | Coat | Coat | Coat |
| Kind | Al$_2$O$_3$ 20 | Al$_2$O$_3$ | Al$_2$O$_3$ 30 | Al$_2$O$_3$ 40 | Al$_2$O$_3$ 30 Phenol resin 30 |
| Content (wt. %) | C 80 | 100 | SiC 70 | SiC 60 | SiC 40 |
| Density (g/cm$^3$) | 3.16 | 3.06 | 3.14 | 3.09 | 3.13 |
| Flexural strength (kg/mm$^2$) |  |  |  |  |  |
| Room temperature | 70.2 | 58.3 | 69.4 | 52.6 | 64.7 |
| 1400° C. | 41.5 | 38.1 | 40.3 | 41.5 | 39.7 |

|  | Exp. 12 | Exp. 13 | Exp. 14 | Exp. 15 | Exp.16 |
|---|---|---|---|---|---|
| Sintering additive |  |  |  |  |  |
| Kind | Al$_2$O$_3$ | Al$_2$O$_3$ | Al$_2$O$_3$ | Al$_2$O$_3$ | Al$_2$O$_3$ |
| Content (wt. %) | 4 | 6 | 9 | 12 | 1 |
| Atmosphere |  |  |  |  |  |
| Method | Coat | Mold*4 prod. | Bury | Bury | Bury |
| Kind | Al$_2$O$_3$ 50 | Al$_2$O$_3$ 20 | Al$_2$O$_3$ 10 | Al$_2$O$_3$ 10 | Al$_2$O$_3$ 10 |
| Content (wt. %) | SiO$_2$ 50 | SiC 80 | SiC 90 | SiC 90 | SiC 90 |
| Density (g/cm$^3$) | 3.04 | 3.14 | 3.12 | 3.11 | 2.92 |
| Flexural strength (kg/mm$^2$) |  |  |  |  |  |
| Room temperature | 50.5 | 75.4 | 72.8 | 69.3 | 27.1 |
| 1400° C. | 35.8 | 45.1 | 42.9 | 47.3 | 25.3 |

Note:
*1α-SiC was used as the silicon carbide source (the other sources are β-SiC)
*2Burying method: A molded product was buried in a mixed powder. (the kind and content are shown in the Table)
*3Coating method: A slurry of the mixed powder and ethanol was coated on an inner wall of a carbon casing and was dried. A molded product was held in it. A coated thickness was about 0.5 mm.
*4Molded product: A molded product was placed in an unsintered molded product casing made of the mixed powder.

The structures of the cut surfaces of the sintered products are as follows:

Samples 7 to 9 and 11 to 15

The same as Sample 1.

Sample 10

The same as Sample 6.

Sample 16

The same as Sample 4.

We claim:

1. A process for producing a dense sintered silicon carbide ceramic having high strength and a flexural strength of at least 25 kg/mm$^2$ at room temperature at 1400° C. which comprises: molding a mixture of an oxygen-containing aluminum compound which can be converted into aluminum oxide by heating in a non-oxidative atmosphere at a ratio of 0.5 to 35 wt.% as Al$_2$O$_3$ with the remaining ceramic material substantially being silicon carbide; and pressureless sintering said mixture in a non-oxidative atmosphere at 1900° to 2300° C.

2. The process according to claim 1 wherein said oxygen-containing aluminum compound is incorporated at a ratio of 2 to 20 wt.% as Al$_2$O$_3$.

3. The process according to claim 2 wherein aluminum oxide is used as said oxygen-containing aluminum compound.

4. The process according to claim 1 wherein a mixture of said oxygen-containing aluminum compound at a ratio of 6 to 35 wt.% and silicon carbide having a specific surface area of at least 10 m$^2$/g and a purity of at least 95% at substantial residual portion is molded and treated by said pressureless sintering to obtain the product having a flexural strength of at least 35 kg/mm$^2$ at room temperature and 1400° C. and a density of at least 3.0.

5. The process according to claim 1 wherein a mixture of said aluminum oxide source at a ratio of 0.5 to 6 wt.% and silicon carbide having a specific surface area of at least 15 m$^2$/g and a purity of at least 98% at substantial residual portion is molded and treated by said pressureless sintering to obtain the product having a flexural strength of at least 40 kg/mm$^2$ at room temperature and 1400° C. and a density of at least 3.0.

6. The process according to claim 1 wherein β-silicon carbide having a specific surface area of at least 10 m$^2$/g and a purity of at least 98% is used to obtain a sintered silicon carbide having a flexural strength of at least 40 kg/mm$^2$ at room temperature and 1400° C.

7. The process according to claim 6 wherein said oxygen-containing aluminum compound is incorporated at a ratio of 2 to 20 wt.% as Al$_2$O$_3$.

8. A process for producing a sintered silicon carbide ceramic having high strength and a flexural strength of at least 25 kg/mm$^2$ at room temperature and 1400° C., which comprises: molding a mixture of an oxygen-containing aluminum compound which can be converted into aluminum oxide by heating in a non-oxidative atmosphere at a ratio of 0.5 to 35 wt.% as Al$_2$O$_3$ with silicon carbide being the substantial remaining material of the ceramic mixture; and sintering said molded product at a temperature of 1900° to 2300° C. in a non-oxidative atmosphere containing an aluminum component.

9. The process according to claim 8 wherein said atmosphere around said silicon carbide molded product is formed by aluminum powder and/or aluminum compound powder or a molded product of said powder or a sintered product obtained by sintering said molded product.

10. The process according to claim 9 wherein said aluminum compound powder is one or more of alumina, aluminum nitride, aluminum carbide, aluminum silicon carbide (Al$_4$SiC$_4$), aluminum boride and aluminum phosphide.

11. The process according to claim 9 wherein said aluminum powder and/or aluminum compound powder or a molded product of said powder or a sintered product obtained by sintering said molded product contains 2 to 40 wt.% of aluminum component.

12. The process according to claim 8 wherein said oxygen-containing aluminum compound at least a portion of alumina ($Al_2O_3$).

13. The process according to claim 8 wherein said atmosphere comprises aluminum, silicon and/or carbon as components.

14. The process according to claim 8 wherein said atmosphere comprises an inert gas.

15. A process for producing a sintered silicon carbide having high strength and a flexural strength of at least 25 kg/mm$^2$ at room temperature and 1400° C., which comprises: molding a mixture of an oxygen-containing aluminum compound which can be converted into aluminum oxide by heating in a nonoxidative atmosphere at a ratio of 0.5 to 35 wt.% as $Al_2O_3$ in silicon carbide having a specific surface area of at least 10 m$^2$/g and a purity of at least 95%; and pressureless sintering said molded product in an atmosphere comprising an aluminum component at 1900° to 2300° C.

16. The process according to claim 15 wherein a mixture of an oxygen-containing aluminum compound at a ratio of 2 to 20 wt.% as $Al_2O_3$ and silicon carbide at the residual portion is sintered to obtain a sintered product having a flexural strength of at least 35 kg/mm$^2$ at a room temperature and 1400° C.

17. The process according to claim 16 wherein aluminum oxide is used as said oxygen-containing aluminum compound.

18. The process according to claim 15 wherein $\beta$-silicon carbide is used as said silicon carbide.

19. The process according to claim 15 wherein said atmosphere comprising an aluminum component is formed by aluminum powder and/or an aluminum compound or a molded product of said powder or a sintered product obtained by sintering said molded product.

20. The process according to claim 1, wherein said mixture of an oxygen-containing aluminum compound and silicon carbide is such that a material is formed having a micro structure characterized by an intertwined fine prismatic or plate-like silicon carbide component.

21. The process according to claim 1, wherein said silicon carbide has a surface area of at least 5 m$^2$/g.

* * * * *